United States Patent [19]

Weltmer, Jr.

[11] 4,417,909

[45] Nov. 29, 1983

[54] GAS SEPARATION PROCESS

[75] Inventor: William R. Weltmer, Jr., Murray Hill, N.J.

[73] Assignee: Airco, Inc., Montvale, N.J.

[21] Appl. No.: 966,446

[22] Filed: Dec. 4, 1978

[51] Int. Cl.³ ............................................... F25J 3/06
[52] U.S. Cl. ........................................... 62/12; 62/22
[58] Field of Search .................... 62/12, 14, 15, 22

[56] References Cited

U.S. PATENT DOCUMENTS

| 2,503,939 | 4/1950 | De Baufre | 62/14 |
| 2,698,523 | 1/1955 | Hnilicka | 62/22 |
| 3,109,726 | 11/1963 | Karwat | 62/14 |
| 3,501,923 | 3/1970 | Lehmer | 62/22 |

Primary Examiner—Norman Yudkoff
Attorney, Agent, or Firm—David L. Rae; Larry R. Cassett

[57] ABSTRACT

Method and apparatus for separating gases having different partial pressures at a given temperature includes introducing a multi-component gas mixture into a chamber, reducing the temperature therein to solidify and liquefy all components. At least one component remains liquid which is evaporated, thereby separating such component from the solidified components which may then be liquefied and recovered. The process is especially useful in recovering radioactive krypton and xenon from the off gas streams of nuclear processes such as nuclear fuel reprocessing.

2 Claims, 2 Drawing Figures

GAS SEPARATION PROCESS

FIELD OF THE INVENTION

The present invention relates generally to the field of gas separation and more specifically to the separation of gases the partial pressures of which substantially differ from one another at a particular temperature.

BACKGROUND OF THE INVENTION

It is well known that in nuclear fuel reprocessing plants a certain amount of radioactive krypton gas is released during chemical processes which are used to dissolve spent nuclear fuel rods. Rather than allow such radioactive gas to contaminate the atmosphere, environmental standards generally require that such krypton be recovered and stored for a period of about 100 years. As the half-life of krypton is approximately 10 years, storage for 100 years will reduce the radioactivity of the krypton to virtually insignificant levels, at which time it will be comparatively safe to use or release the gas to atmosphere. Storage of a large quantity of gas for a period of 100 years obviously poses substantial problems and cost with respect to such storage, even if only in terms of the space required. Therefor, it has been an objective of the art to develop an efficient process for separation of these radioactive gases so that the least amount possible of the particular gas need be stored. Hence, there is and has been a need for an efficient method of separating radioactive krypton from other gases.

In one common type of nuclear fuel reprocessing plant the krypton arrives at the separation point mixed with argon, xenon and nitrogen; other gaseous products of the fuel dissolution process such as oxygen and hydrocarbons having been removed by catalytic combustion or adsorption methods. However, it is difficult to remove xenon from nitrogen by distillation methods as the pressures and temperatures typically used are such that any xenon present tends to freeze and clog columns, etc. By comparison, Kr and Xe can be separated from oxygen with relative ease, although there are some freezing problems with this process as well. Hence, the art has recognized that a need exists for a highly efficient and inexpensive process for separation of the gases krypton and xenon from nitrogen. In particular, a method is needed for the efficient separation of xenon, as the krypton can then be distilled from the nitrogen.

Another approach to the problem of nuclear fuel reprocessing plants involves a similar process to that already described except that the krypton and xenon come mixed together with helium gas which, of course, is also inert. A process for the separation of the krypton and xenon from helium is described in U.S. Pat. No. 4,080,429. The described process is carried out in sealed containers and the retorts and reaction vessels utilized are continually flushed with helium. The krypton and xenon are separated from the helium by passing the mixture into a large container having surfaces cooled by liquid nitrogen. As the freezing point of the krypton and xenon are above the liquefaction temperature of nitrogen, while that of helium is below such nitrogen boiling point, the helium remains gaseous while the krypton and xenon freeze out on to the walls of the container while the helium flows therethrough. However, the fact that the krypton has a significant partial pressure—1.7 mm Hg at liquid nitrogen temperatures means that some of the krypton will be entrained in and necessarily escape with the helium gas streams; therefore, the helium must be further processed, in order to ensure that virtually all of the krypton has been removed therefrom. Moreover, the xenon and krypton remaining in the container are subsequently separated from each other in order to avoid storing xenon for unnecessarily long periods of time. This approach, while not unworkable, is not especially efficient and, in particular, is not well suited to the separation of nitrogen from krypton and xenon because much more nitrogen is used in the nitrogen-based approach than is helium in the other method discussed above. Thus, even more krypton and xenon will tend to become entrained with the nitrogen than with the helium. Consequently, it is an object of the invention to provide an efficient, simple and workable method for separating one or more gases from a multi-component feed gas stream.

It is a further object of the invention to provide a method whereby large quantities of nitrogen can be thoroughly separated from a gas mixture containing minor quantities of krypton and xenon.

It is a further object of the invention to provide a general method for separation of gases which have large differences in partial pressure at a given temperature from one another.

Other objects of the present invention will become apparent from the detailed description of an exemplary embodiment thereof which follows and the novel features of the invention will be particularly pointed out in conjunction with the claims appended hereto.

SUMMARY OF THE INVENTION

The method of the invention comprises admitting a quantity of a gas mixture consisting of essentially one or more gases which have significantly different partial pressures at a given temperature to a container, the walls of which are at least partially cooled to a temperature at which all the components of the gas mixture will liquefy and at which at least some of the components will solidify. After sufficient time has been spent that essentially equilibrium conditions have been reached, the liquefied component is gasified and piped to another part of the process, or the liquefied component may simply be removed from the container. Heat may be applied to the liquefied component in order to speed the evaporation process. After all the liquefied component has been removed, the container may be allowed to warm up to melt the frozen-out component of the gas mixture which can then be removed by draining or evaporating such component.

DESCRIPTION OF THE DRAWINGS

The invention will be more clearly understood by reference to the following description of the exemplary embodiment thereof in conjunction with the following drawing in which.

DESCRIPTION OF THE PREFERRED EMBODIMENT

It is to be understood throughout this specification that the process according to the invention is generally applicable to the separation of gases from one another.

However, the primary application of the process is expected to be the separation of krypton and xenon from nitrogen and for purposes of illustration, the invention will be described in those terms.

Figure 1:
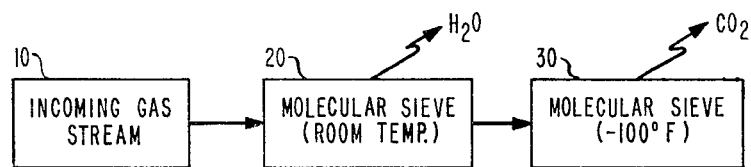
FIG. 1 is a diagrammatic view of a process for separating one gas from another.
Figure 1:
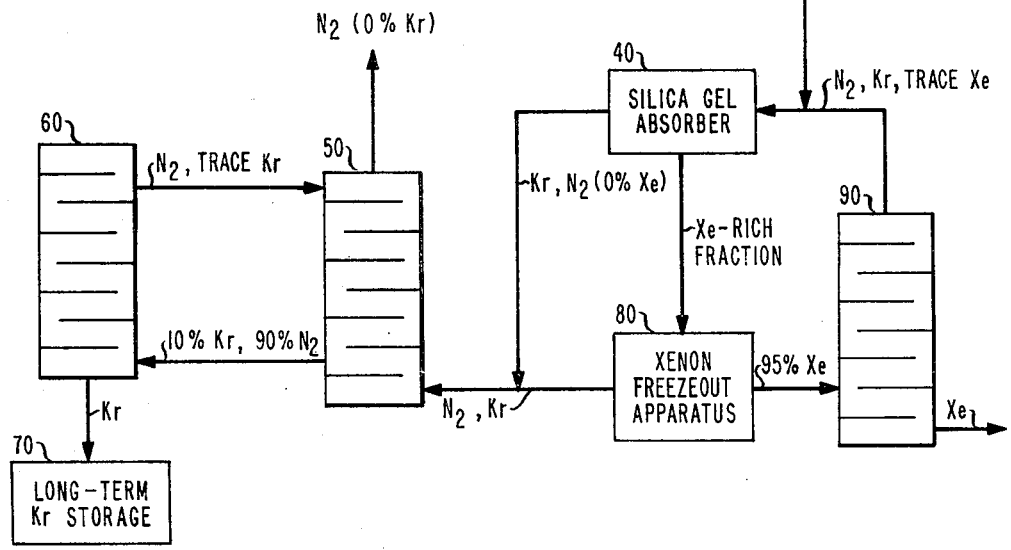

Referring first to FIG. 1, the incoming gas stream, consisting essentially of nitrogen, argon, water vapor, carbon dioxide and very small quantities of krypton and xenon, is shown arriving at 10. In all the processes described herein, argon behaves similarly to the nitrogen and argon/nitrogen mixtures will therefore sometimes be referred to simply as nitrogen. The incoming gas stream is passed first through a conventional molecular sieve 20, typically operated at room temperature for removing water, and a second molecular sieve 30, generally operated at about $-100°$ F. for removing carbon dioxide. The gas stream, now consisting essentially of 98% nitrogen, 2% argon, and krypton and xenon in quantities of hundreds of parts per million, is passed through adsorber 40, which may be comprised of a bed of silica gel, which removes essentially all the xenon from the stream, along with considerable nitrogen and a small quantity of krypton. Typically, two such beds are arranged in parallel, with appropriate controls, so that one can be regenerated by, e.g., heating and flushing with nitrogen, while the other is adsorbing the xenon-rich fraction of the stream. Essentially all the xenon can be removed from the stream by this step. However, the xenon-rich fraction is only approximately 30% xenon, the balance being roughly 67% $N_2$ and 3% krypton, so that the xenon-rich fraction is generally further purified before it can be used or released to the atmosphere. The process typically practiced to further refine the xenon-rich fraction, which will be described more fully hereafter, embodies the process and apparatus according to the invention.

After removal of substantially all the xenon from the gas stream in adsorber 40, the krypton can be separated by fractional distillation methods in columns or stills 50 and 60 without danger of xenon freeze-up and clogging. A first krypton-rich stream (up to approximately 10% krypton) is produced by still 50, which may be arranged to vent krypton-free $N_2$ to the atmosphere; this stream may be further refined in still 60 to yield a product of approximately 90% or greater krypton, which is then held in long term storage 70 as described above until its radioactivity has diminished to acceptably low levels to permit its release or use.

Figure 2:
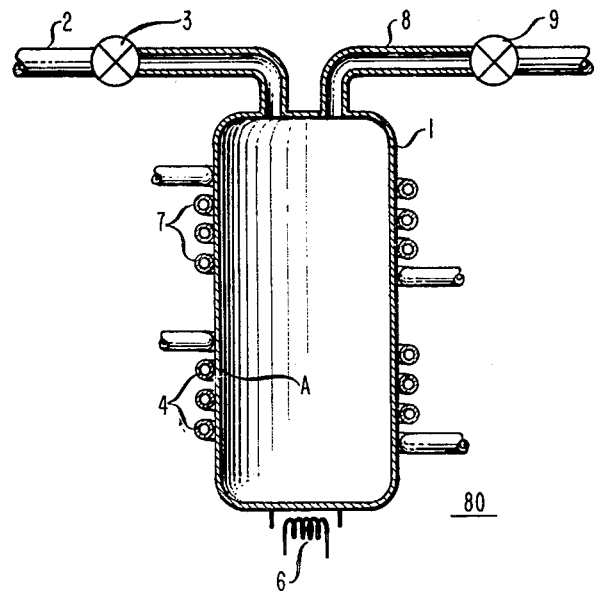
FIG. 2 is a schematic cross sectional view of a freeze-out exchanger device suitable for the practice of the process depicted in FIG. 1.

The significant improvement made by the present invention lies in the method used to separate xenon from nitrogen and krypton after the xenon-rich fraction of the gas stream has been removed by adsorber 40 and passed to xenon freeze-out apparatus 80, an embodiment of which is illustrated in greater detail in FIG. 2.

Referring now to FIG. 2, a large metallic container 1 is illustrated which is encircled by tubular coils 7 and 4 and which preferably is fitted with an electric heater 6 at its base. In operation, a batch of a mixture of nitrogen, xenon and krypton gas is introduced into chamber 1 through line 2 and valve 3. Either prior to or after the introduction of the fixed quantity of the gas mixture into container 1, liquefied nitrogen is caused to flow through coil 4 so that the wall of container 1 reaches the temperature of the liquid nitrogen, approximately $-320°$ F. (77 K.). At this temperature, all three components of the mixture will first liquefy and thereafter the krypton and xenon will tend to freeze out; being denser than the nitrogen, they will tend to collect on the walls and bottom of the container 1. After a suitable time has been spent in this condition, the coil 7 may also be filled with liquid nitrogen so that the entire interior wall of the container eventually reaches $-320°$ F. (77 K.). At this point, valve 9 may be opened permitting the escape of gaseous nitrogen through tube 8. Preferably a slight vacuum is applied to reduce the pressure in the vessel to a point below that in the tubes 4 and 7; alternatively the $LN_2$ in tubes 4 and 7 can be slightly pressurized. Additionally, heater 6 may be energized in order to speed the evaporation of nitrogen. So long as the liquid nitrogen is present in tubes 4 and 7, the walls will stay at $-320°$ F. (77 K.) despite the introduction of a small quantity of heat at 6 and therefore most of the krypton and substantially all of the xenon will remain frozen solidly to the walls of the container. When all the nitrogen has been exhausted from container 1, the heater may be further energized and liquid nitrogen is removed from coils 4 and 7. The krypton and xenon will then liquefy to be drained, or will be gasified and removed via tube 8 and valve 9, depending on the precise temperature and pressure conditions existing within container 1. Preferably the container 1 is warmed from the top down so as to avoid large, sudden changes in pressure caused by any liquid xenon vaporizing on the heated surface near the heater 6.

At 77° K., the approximate vapor pressures of $N_2$ are 758 torr, of krypton 1.8 torr and of xenon 2.0 millitorr. The great difference between the vapor pressures of nitrogen and that of the other gases means that the separation can be made very efficient; to be more exact, the fraction of the xenon that is evaporated with the nitrogen is $$\frac{\text{vapor pressure of xenon}}{\text{vapor pressure of } N_2} \text{ or } \frac{2 \times 10^{-3}}{7.58 \times 10^2} \text{ or}$$

approximately $2.64 \times 10^{-6}$. The krypton fraction lost is considerably more:

$$\frac{\text{vapor pressure of krypton}}{\text{vapor pressure of } N_2} \text{ or } \frac{1.8}{758} \text{ or } 2.37 \times 10^{-3}$$

This fraction of krypton separated from xenon with the nitrogen is rather too high to be released to the atmosphere and therefore it and the nitrogen with which it is mixed are returned to an earlier stage in the krypton recovery process (FIG. 1) for re-refining.

If the nitrogen is removed by simply warming it and venting the chamber 1, the xenon which remains is mixed with approximately 7% $N_2$ and 1% krypton. This efficiency can be further improved by evacuation of container 1; in this way the nitrogen level can be brought below about 2%. The xenon may be further refined in a conventional still or column 90 (FIG. 1).

As indicated above, the process according to the invention is a batch rather than a continuous process. That is, that only a given quantity of the gas mixture is introduced into container 1 at any one time and it remains there until equilibrium conditions have been approached. In continuous processes, difficulties arise due to the inability to predict conditions and unavoidable variations from equilibrium will result in losses of separation efficiency and, potentially, loss to atmosphere of radioactive materials such as Kr-85.

It will be appreciated by those skilled in the art that various improvements and refinements can be made to the method of the invention which will further improve its efficiency. For example, improvements can be realized by reducing the temperature of the container walls by subcooling nitrogen in tubes 4 and 7, thereby reducing wall temperature below 77° K. In fact, when the process is so practiced, the difference of several degrees in the temperature of the wall results in a reduced krypton vapor pressure thereby allowing more complete retention of the krypton with the xenon. If the vessel is thereafter rewarmed to 77° K. then application of a suitable vacuum will preferentially sublime the krypton from the xenon.

It will be understood by those skilled in the art that the process according to the invention is aided in its remarkable efficiency by the fact that krypton and xenon exhibit low partial pressures at the temperature of liquid nitrogen (77° K.). Although xenon is soluble in liquid nitrogen and evaporation of $LN_2$ causes the solubility limit of xenon in $LN_2$ to be reached, very little dissolved xenon is evaporated due to its low partial pressure at this temperature. Thus, in addition to xenon freezing out on the walls, etc. of container 1, solid xenon that was dissolved in $LN_2$ will remain in the container upon evaporation of liquid nitrogen. Consequently a thorough separation of xenon and nitrogen is achieved. It will be realized that distillation columns will not be effective to perform such a separation as the necessity of operation at approximately liquid nitrogen temperatures (77° K.) due to use of $LN_2$ as reflux will cause xenon to freeze and clog the column. Such freezing precludes the column from operating under equilibrium conditions and therefore, efficient and thorough separation of xenon and nitrogen is precluded.

Finally, it will be appreciated that the scope of the invention is far broader than the specific embodiment discussed above; therefore, the invention is more properly delimited by the following claims.

I claim:

1. A method for separating xenon from a mixture consisting essentially of xenon, argon, nitrogen and krypton, comprising the steps of: (a) admitting a fixed quantity of said mixture into a chamber; (b) at least partially cooling the walls of said chamber by heat exchange with liquid nitrogen; (b) allowing sufficient time for essentially equilibrium conditions to be reached, at which the argon and nitrogen components of said mixture are liquefied and the xenon and krypton components are solidified; (c) removing the nitrogen and argon without removal of krypton and xenon; (d) thereafter warming the chamber to a degree such that the krypton and xenon are reliquefied; and (e) removing the reliquefied krypton and xenon from said chamber.

2. The method for separating xenon from a gas mixture consisting essentially of xenon, argon, nitrogen and krypton gases, comprising the steps of: (a) admitting a fixed quantity of said mixture into a chamber; (b) cooling said chamber by heat exchange with liquid nitrogen; (c) establishing equilibrium conditions in said chamber whereby said argon and nitrogen components are liquefied and said krypton and xenon components are solidified; (d) removing said nitrogen and argon components; (e) thereafter applying a vacuum pressure to said chamber such that said solid phase krypton component is sublimed and thereby separated from said solid phase xenon component; (f) removing said sublimed krypton component from said chamber; and (g) thereafter warming said chamber to reliquefy said solid phase xenon component.

* * * * *